United States Patent [19]
Bianchi et al.

[11] 4,395,436
[45] Jul. 26, 1983

[54] PROCESS FOR PREPARING ELECTROCHEMICAL MATERIAL

[75] Inventors: Giuseppe Bianchi; Antonio Nidola; Gian N. Martelli, all of Milan, Italy

[73] Assignee: Oronzio de Nora Impianti Elettrochimici S.p.A., Milan, Italy

[21] Appl. No.: 206,746

[22] Filed: Nov. 14, 1980

[30] Foreign Application Priority Data

Dec. 20, 1979 [IT] Italy .................. 28250 A/79

[51] Int. Cl.$^3$ .............................. B05D 5/12
[52] U.S. Cl. .................. 427/53.1; 427/126.3; 427/126.5; 427/226; 427/377; 427/376.2; 427/376.4; 204/157.1 H; 204/290 R; 204/290 F; 219/121 L; 219/121 LM
[58] Field of Search ........... 427/53.1, 126.3, 126.5, 427/226, 377, 376.2, 376.4; 423/593, 598; 219/121 L, 121 LM; 204/290 R, 290 F, 157.1 L

[56] References Cited

U.S. PATENT DOCUMENTS

| | | | |
|---|---|---|---|
| 4,005,004 | 1/1977 | Seko et al. | 427/126.5 |
| 4,112,140 | 9/1978 | Heikel et al. | 427/126.5 |
| 4,122,240 | 10/1978 | Banas et al. | 427/53.1 |
| 4,212,900 | 7/1980 | Serlin | 427/53.1 |

FOREIGN PATENT DOCUMENTS

| | | | |
|---|---|---|---|
| 573556 | 4/1959 | Canada | 423/598 |
| 52-129942 | 2/1977 | Japan | 204/157.1 L |

OTHER PUBLICATIONS

Vossen et al., *Thin Film Processes,* Academic Press, NY, 1978, pp. 282-297.
Chang, IBM Tech. Dis. Bul., vol. 20, No. 6, Nov. 1977.

*Primary Examiner*—Norman Morgenstern
*Assistant Examiner*—Richard Bueker
*Attorney, Agent, or Firm*—Pollock, Vande Sande & Priddy

[57] ABSTRACT

A process for preparing an electroconductive metal coating on a substrate wherein precursor compounds capable of decomposing to form an electroconductive coating are subjected to localized high intensive heat, followed by rapid cooling, while maintaining the bulk of the substrate and/or the surrounding atmosphere at a lower temperature.

The process is particularly suited for preparing valve metal substrates coated with mixed oxides comprising at least one metal belonging to the platinum group and a valve metal. Such can be utilized as dimensionally stable anodes in electrolytic processes. The process is moreover useful for applying oxides coating on metal and non-metal substrates of different kinds, such as ceramics, glass, plastics and polymeric organic supports.

51 Claims, 8 Drawing Figures

PROCESS FOR PREPARING ELECTROCHEMICAL MATERIAL

DESCRIPTION OF THE INVENTION

1. Technical Field

The present invention is concerned with preparing electroconductive metal coatings, such as catalytic mixed oxides, and particularly suitable for providing substrates coated with the mixed oxides. A number of products obtained by the process of the present invention are suitable as anodes in electrolytic processes. The products obtained according to the present invention are especially dimensionally stable.

2. Background Art

The advent of dimensionally stable anodes represents one of the most important steps in the progress of industrial electrochemistry over the last twenty years or so.

The advantages offered by dimensionally stable anodes are exploited in various electrochemical processes, such as cathodic protection, electro-organic oxidations and electrolysis of aqueous solutions. Due to the outstanding industrial importance of this last process, the improvements concerning the use and the method for preparing dimensionally stable anodes will be particularly described referring to the same and more precisely to the electrolysis of alkali metal halides, such as sodium chloride brine, for the production of chlorine, caustic soda, and hydrogen.

Typically, dimensionally stable anodes comprise a valve metal substrate provided with an electrocatalytic coating consisting of mixed oxides of at least one metal of the platinum group and at least a valve metal.

The electrocatalytic properties of the oxide mixtures coating the valve metal substrate depend on various parameters, such as, for example, the chemical characteristics of the oxide phase itself, its degree of crystallinity, the grain size and the structural disorder of the crystal lattice, due to the presence of defects in the mixed oxides crystal phase. Defects of the crystal lattice may be caused by nonstoichiometry of the oxides or by doping of the oxide phase with other metals.

The oxides, constituting the non-passivable coating of dimensionally stable anodes, act as semi-conductors, exhibiting an electrical (electronic) conductivity sometimes very close to that of metals; this semiconductivity is an essential condition for the electrolysis which requires an oriented migration of charges induced by an electric field.

Several years ago, the electrocatalytic properties of mixed oxides of valve metals and metals of the platinum group, particularly mixed oxides of titanium and ruthenium, were considered as anodic surface for the electrolysis of sodium chloride brine. Said mixed oxides, utilized for coating titanium or other valve metal substrates, consist of a mixed crystal phase, comprising titanium and ruthenium oxides which have similar crystallographic characteristics, giving rise to a solid solution active phase having a composition of the formula $Ti_{1-x}Ru_xO_2$, where x may range between 0.20 and 0.80. Usually the percentage of Ru in the coating is comprised between 30 and 70%, preferably between 40 and 60%.

While inside said crystal phase titanium cannot assume a valence higher than +4, this is easily assumed by ruthenium, so that the mixed oxide crystals contain ruthenium and titanium atoms exhibiting valences respectively higher and lower than +4. The high conductivity of the mixed oxide is, to a large extent, attributable to this imbalance of valences.

The simultaneous presence of at least two dissimilar metals, such as titanium and ruthenium, is highly desirable to obtain a durable catalytic effect of the mixed oxide phase. In fact, while the titanium oxide, $TiO_2$, present largely as rutile, exhibits a strong chemical resistance but a very scarce conductivity (in the range of $10^{-10} \Omega^{-1} cm^{-1}$), ruthenium oxide, $RuO_2$, is conversely characterized by a scarce chemical resistance but an outstanding electrocatalytic activity for chlorine anodic discharge.

The simultaneous presence of both oxides, for example in a unitary weight ratio, referred to metals, to form a solid solution phase, allows to obtain a mixed crystal phase exhibiting a high chemical resistance and a remarkable electrocatalytic activity.

According to a conventional production technique, dimensionally stable anodes, typically consisting of a substrate or base of titanium coated with an electrocatalytic deposit of ruthenium and titanium mixed oxides, are prepared applying onto the titanium base by spraying, brushing or other suitable technique, a solution of ruthenium and titanium salts (e.g. chlorides of the metals), followed by drying and heating at a temperature varying from about 350° to about 500° C. for about 5 to about 25 minutes, to decompose the salts.

This procedure is repeated several times until the desired thickness of the oxide coating is obtained. Often, after the last coating is applied, the electrode is further heated to a somewhat higher temperature (from about 450° to about 550° C.) for a period of about 30 to about 80 minutes.

The peculiar electrocatalytic properties of solid solutions phases, such as $Ti_{1-x}Ru_xO_2$, are due to the high degree of crystallinity, to lattice disorder and to the nonstoichiometry of the mixed oxide phase. The conventional method used to produce the coatings presents several shortcomings:

(a) the temperature cannot exceed 550°–600° C. in order not to excessively oxidize the titanium substrate;

(b) heating must take place gradually since the entire metal structure must heat up to decomposition temperature, together with the coating layer of salts, otherwise the substrate would act as a heat dispersor, creating a severely nonuniform temperature profile through the coating thickness;

(c) since heat is largely transmitted by radiation from the hot oven walls to the structure, the coating layer tends to assume a temperature higher at the surface and lower at the coating-metal substrate interface. This is enhanced also by the fact that the coating layer is less heat conductive than the metal substrate.

Some of these shortcomings may be minimized by resorting to a careful control of the temperature-time profile throughout the heating cycle but, as has been experienced, they cannot be completely eliminated.

The necessarily long heating periods together with the nonuniform temperature profile through the thickness of the coating layer pose serious disadvantages:

(a) the oxides tend to form first at the surface of the coating layer and the conversion of the salts to the oxides proceeds from the surface of the coating toward the interface between the coating layer and the substrate; this introduces mechanical stresses that excessively fracture the coating layer and a phase segregation between successively applied layers appears to take place;

(b) the necessarily long residence times at the decomposition temperature favor phase segregation and tend to increase the degree of stoichiometry of the oxides;

(c) for the same reasons, dopants tend to segregate out of the mixed oxide phases weakening the electrochemical resistance of the coating layer.

DISCLOSURE OF THE INVENTION

It is a principal object of the present invention to provide a novel method of preparing electroconductive metal coatings and especially mixed oxides which overcome the limitations of the known methods.

According to the process of the present invention, the decomposable compounds of the metals are heated to the desired temperature which may be advantageously much higher than the temperature used in the conventional process, within extremely short rise-time and remain at such temperature for very small periods of time, sufficient to convert the compounds to the respective electroconductive metal. The time, however, is far too short to raise the temperature of the bulk of the substrate to that of the decomposable compounds, and in the case of forming oxides, is far too short to permit the reaching of stoichiometric equilibrium with the oxidizing atmosphere and to allow for the formation and segregation of clearly defined oxide phases.

According to the process of the present invention, the substrate is hardly affected by the heating process, and its thermal capacity characteristics do not pose any limitation to the thermal decomposition process. The layer of thermally decomposable compounds of the metals (e.g. salts of the metals) is locally subjected to intense heat without the necessity of heating the bulk of the substrate, whereby at least a substantial portion thereof and/or the surrounding atmosphere remain at a lower temperature than that of the coating. This may be accomplished by heating by radiation for an extremely short time. Substantially the whole layer is scanned in succession by the heating beam.

BEST AND VARIOUS MODES FOR CARRYING OUT INVENTION

According to a preferred embodiment of the process of the invention, a solution of thermoreducible salts of the desired metals is previously applied on a suitable substrate according to know techniques. After evaporation of the solvent the salt layer is subjected to laser radiation for an extremely short time, and in the case of forming oxides in the presence of air or other oxidizing atmosphere, sufficient to obtain the thermal decomposition but, at the same time, preventing the so formed mixed oxide phase highly nonstoichiometric and disordered from reaching the stoichiometric equilibrium with the oxidizing atmosphere and from going through lattice arrangement.

It is thus possible to obtain oxide phases which may be metastable at ambient temperature, by virtue of the inverted and extremely short heating cycle. In fact, the heating cycle is characterized by a rise-time in the order of a few milliseconds and by a cooling-time also in the order of seconds. Therefore, the decomposition temperature of the metal salts which may be between about 300° and 1500° C. is reached almost instantaneously, and the residence time of the coating within such temperature range is extremely short. This produces a "quench" or "freeze" effect on the formed mixed oxidic phase which does not have time to go through phase segregation and crystal lattice arrangement processes.

This preserves the mixed oxide phase in a high degree of disorder and of nonstoichiometry and also prevents the segregation of doping oxide phases or of phases having reduced chemical stability of reduced electroconductive characteristics out of the host crystal structure. Moreover, the substrate and the surrounding atmosphere, which hardly heat up to the maximum temperature, act essentially as heat sinks during the cooling of the oxide phase enhancing the rapidness of the cooling for a better quenching effect. The temperature of the bulk of the substrate may be kept in practice as low as desired and may advantageously be kept at room temperature by assisting, if necessary, the heat dispersion with forced circulation of a cooling fluid such as cool air. When using a laser radiation, according to the preferred method of the invention, the specific power within the laser beam is preferably comprised between 0.5 and 10 kW/cm$^2$ and the times of interaction of the scanning beam with the coating may vary between 0.5 and 0.01 seconds.

According to the process of the present invention, the very short thermal decomposition times allow to operate within a larger range of temperatures compared with the conventional method, wherein temperatures higher than about 500° to 600° C., besides causing segregation of phases chemically unstable under the anodic conditions of an electrolysis cell, such as $RuO_2$, $RuO_3$ and $RuO_4$ (this last one is even volatile), produce distortion of the valve metal base structure, especially in case of complex electrode geometry.

According to the process of the present invention, with operating temperatures preferably in the range of about 600° to about 1200° C. and reduced heating times, a greater variety of the electrocatalytic coating composition may be prepared, comprising, for example, mixed valve metal and noble metal oxides containing smaller amounts of dopant species, such as $ZrO_2$, $SnO_2$, $Sb_2O_3$, $Co_3O_4$, and others. In fact, said species may dissolve into the mixed oxides phase at temperatures often higher than the maximum temperature tolerable by the conventional process whereby said dopants or others, if present, tend to form separate phases segregated from the mixed oxide phase.

Another advantage of the present invention is represented by the fact that the extremely short thermal decomposition times allow to limit oxygen diffusion from the oxidating atmosphere to the interface coating/substrate, through pores or crystal defects. In this way, it is possible to keep under control the formation of the valve metal oxide layer whose thickness, beyond certain values, may give rise to remarkable ohmic losses at the interface.

Yet, another advantage of the method of the invention is represented by the fact that it is possible to resort to different means to control very accurately the oxygen availability, in order to form the desired oxidic phase; for example, by using precursor compounds of the metal already containing the desired amount of oxygen, such as nitrates of the metals or by adding to the mixture of the precursor compounds particular oxygen containing decomposable compounds which liberate the necessary oxygen during their heat dissociation. In this way the oxidic phase may be produced even under non oxidizing atmosphere.

However, every advantage of the present invention can be particularly appreciated depending on the practical utilization of the anodes so prepared. For example, in case of chlorine, caustic soda and hydrogen production by electrolysis of saturated or nearly saturated NaCl brine, according to the method of the present invention for preparing the electrocatalytic phase, coatings are produced whose active life satisfactorily compares with that of coating prepared according to the conventional technique, and, furthermore, do not entail problems of geometrical stability, which are strictly connected to the long heating time necessary to produce the mixed oxide according to the conventional technique.

Similarly, according to the method of the present invention, the electrocatalytic coating exhibits a stronger chemical resistance when the anodes are employed under conditions which involve oxygen evolution as, for example, in the case of water or diluted brine electrolysis, i.e. sea water, for producing on site an aqueous solution of active chlorine for sterilization purposes, either for domestic or industrial uses. In these cases, oxygen evolution appears not to affect the active life of the anodes provided with the coating prepared according to the method of the present invention. This advantage may be partly explained by the absence in the electrocatalytic mixed oxide coating of substantial amounts of single segregated phases, notably unstable phases, such as $RuO_2$, which otherwise tend to form when the conventional method is utilized.

The process of the present invention and the relevant advantages are herein described, referring to the preparation of coatings based on electrocatalytic mixed oxides to be applied onto valve metal substrates; nevertheless, it must be understood that the process may be utilized successfully also for applying coatings onto whatever metal and nonmetal substrates, such as ceramics, glass, polymeric organic supports and the like, and it is not intended to be limited to the formation of mixed oxides phases, but it is well useful for producing oxide phases which are metastable at ambient temperature, or nonoxide compounds, such as metals and metal alloys per se, or intermetallic compounds.

As it will be obvious to anyone skilled in the art, catalytic oxides produced by the process of the present invention may be conveniently formed on a substrate and then recovered from the surface of the substrate either as powder or as a continuous film (for example, by leaching of the substrate) to be used in other forms rather than as coating.

The figures and examples hereinbelow described have the only purpose to illustrate the invention and the relevant advantages and are not intended to limit the same.

EXAMPLE 1

Six sheets of commercial titanium having the dimensions of $20 \times 20 \times 2.5$ mm, after etching in HCl at 20% for 40 minutes at 109° C., are coated with a layer of a solution having the following composition:

| | |
|---|---|
| $RuCl_3.3H_2O$ | 100 mg/cm$^3$ as Ru |
| $TiCl_3.3H_2O$ | 100 mg/cm$^3$ as Ti |
| $H_2O$ | 0.9 cm$^3$ |
| $CH_3CHOHCH_3$ | 0.1 cm$^3$ |

The solution is applied by brush in subsequent layers up to obtain a final load of 0.4 mg of ruthenium per cm$^2$ of projected area.

After each application, the samples are dried under air ventilation at 50°-60° C.

The treated samples are subjected to laser radiation by using different scanning rates and different beam focusing.

The experiment is carried out by using a laser probe type GTE Sylvania Model 973 GAS, with a transport laser designed to give about 3000 Watts of continuous infrared laser radiation with a wavelength of 10.6 m. For alignment purposes, a very low power Model 479 He-Ne laser is used.

The temperature of the titanium substrates remains below the oxide forming temperature during the exposure to the laser radiation.

The treated samples are tested as anodes for the electrolysis of chlorinated and saturated NaCl brine, operating at 10 KA/m$^2$ at 80° C.

The conditions of exposition of the single samples to laser radiation and the corresponding electrochemical performance in the test cell above described are reported in the following Table I, wherein the corresponding characteristics of a sample prepared according to the conventional thermal method, indicated by R, are reported for comparison purposes.

TABLE I

| Sample Description | | | Electrochemical Performances | | | | |
|---|---|---|---|---|---|---|---|
| | | | Anode Potential V (NHE) | | Coating Wear Rate | Coating Colour | |
| Code No. | Beam Focusing mm | Scanning Rate cm/sec. | initial | after 100 h | after 100 hours mg/cm$^2$ | initial | after 100 h |
| 1 | 9 | 1 | 1.50 | 1.52 | negligible | golden brown | initial |
| 2 | 9 | 0.75 | 1.45 | 1.46 | " | slightly violet | " |
| 3 | 6 | 0.75 | 1.40 | 1.40 | " | black-violet | " |
| 4 | 6 | 0.5 | 1.37 | 1.37 | " | black- | " |

TABLE I-continued

| | Sample Description | | Electrochemical Performances | | | | |
|---|---|---|---|---|---|---|---|
| | | | Anode Potential V (NHE) | | Coating Wear Rate | Coating Colour | |
| Code No. | Beam Focusing mm | Scanning Rate cm/sec. | initial | after 100 h | after 100 hours mg/cm$^2$ | initial | after 100 h |
| 5 | 3 | 0.5 | 1.35 | 1.35 | " | violet black | " |
| 6 | 1 | 0.5 | 1.35 | 1.35 | " | black | " |
| R | — | — | 1.36 | 1.36 | " | black | " |

It is clear from Table I that the method of the present invention makes it possible to obtain coatings which favorably compare with the ones prepared according to the conventional thermal treatment.

EXAMPLE 2

Two sheets of commercial titanium of the dimensions 20×20×1.5, after etching in 20% HCl, as described in Example I, are coated with a solution having the following composition:

| | |
|---|---|
| RuCl$_3$.3H$_2$O | 100 mg/cc as Ru |
| TiCl$_3$.3H$_2$O | 95 mg/cc as Ti |
| CoCl$_2$.6H$_2$O | 2.5 mg/cc as Co |
| FeCl$_3$ | 5.0 mg/cc |
| NiCl$_2$ | 2.5 mg/cc as Ni |
| H$_2$O | 0.9 cc |
| CH$_3$CH(OH)CH$_3$ | 0.1 cc |

The samples are coated with subsequent layers, drying after each application under air ventilation at 50°-60° C. up to reach a final amount of Ru of 0.4 mg/cm$^2$ of projected area.

One of the two samples (A) is activated according to the conventional method by heating after each coating, at 400° C. for 15 minutes, and for one hour at 450° C. after the last coating.

Sample B is exposed to laser radiation according to the technique and the experimental apparatus described in Example I, with a distance sample/source of 3 mm and a scanning rate of 0.5 cm/sec (cm/s). The temperature of the titanium substrate remains below the oxide forming temperature during exposure to the laser radiation.

The two samples are tested as anodes for the electrolysis of chlorinated and saturated NaCl brine, operating at 80° C. at 10 KA/m$^2$ for 1000 hours.

In the following Table II, the electrochemical and stability characteristics of the two coating samples are reported for comparison purposes.

TABLE II

| Sample | Coating Activation | Electrochemical Performance Anode Potential V (NHE) | | Coating Wear Rate After 100 hours mg/cm$^2$ |
|---|---|---|---|---|
| | | Initial | After 100 hours | |
| A | By Conventional Method | 1.38 | 1.39 | 0.3 |
| B | By laser irradiation | 1.39 | 1.39 | nil |

This example clearly shows the higher chemical resistance to the anodic conditions of the electrocatalytic coatings prepared according to the method of the present invention, wherein the temperature of the substrate is not raised up to oxide conversion. This is probably due to the fact that, through laser activation, the catalytic layer is substantially homogeneous and is substantially constituted by a single homogeneous mixed oxide phase, while, according to the conventional technique, the electrocatalytic coating appears substantially non-homogeneous and formed by a mixture of single oxide and mixed oxide phases.

EXAMPLE 3

Two sheets of titanium of the dimensions 20×20×1.5 mm, after etching in HCl, are coated with a 20% aqueous hydrochloric acid solution comprising Mn(NO$_3$)$_2$ and SnCl$_4$5H$_2$O, prepared by dissolving the two salts in 0.5 cc of 20% aqueous HCl for each mg of salt and then adding 0.5 cc of formamide.

The application is repeated for six times up to obtain a final amount of 0.5 mg of each metal per cm$^2$ of projected area.

After each coating application, one of the two samples (A) is treated according to the conventional method, heating to 350° C. for 15 minutes and cooling to room temperature. After the last application, it is heated at 450° C. for one hour and cooled to room temperature.

The second sample (B) is exposed to laser radiation according to the process of the present invention by using the experimental technique described in Example I. The distance laser source/sample and the scanning rate are respectively of 5 mm and 0.75 cm/s. The temperature of the titanium substrate remains below the oxide-forming temperature during exposure to the laser radiation.

Both samples A and B are tested in a cell for the electrolysis of NaCl saturated and chlorinated brine at 60° C. and at a current density of 1 A/cm$^2$.

The following Table III shows, for comparison purposes, the electrocatalytic behaviour to chlorine discharge and the stability of the coatings prepared according to the above discussed two different methods.

TABLE III

| Sample | Coating Activation | Electrochemical Behaviour Anodic Potential V (NHE) | | Coating Morphology | |
|---|---|---|---|---|---|
| | | Initial | After 100 hours | Initial | After 100 hours |
| A | By conventional method | 1.98 | 2.00 | compact | cracked |
| B | By laser irradiation | 1.98 | 1.98 | compact | compact |

Also in this case it is clear that by the process of the present invention electrocatalytic coatings are provided which offer higher dimensional stability compared with coatings based on the same formula but prepared according to the conventional thermal activation method, maintaining the same electrocatalytic activity.

EXAMPLE 4

Eight sheets of commercial titanium of the dimensions $20 \times 20 \times 1.5$ mm, after treatment described in Example 1, are coated with different solutions having the following compositions:

TABLE IV

|  | Solution A | Solution B | Solution C | Solution D |
|---|---|---|---|---|
| $Zr(NO_3)_4.4H_2O$ | — | 1 mg/cc as Zr | 50 mg/cc as Zr | 100 mg/cc as Zr |
| $RuCl_3.3H_2O$ | 100 mg/cc as Ru | 100 mg/cc as Ru | 100 mg/cc as Ru | 100 mg/cc as Ru |
| $TiCl_3$ | 100 mg/cc as Ti | 99 mg/cc as Ti | 50 mg/cc as Ti | — |
| $H_2O_2$ (120 Vol.) | 0.15 cc | 0.15 cc | 0.15 cc | 0.15 cc |
| $H_2O$ | 0.8 cc | 0.8 cc | 0.8 cc | 0.8 cc |

The samples indicated by 1A, 1B, 1C and 1D in the following Table V are coated with the solutions A, B, C and D, and treated according to the conventional route which comprises drying, followed by thermal decomposition in oven at 450° C. for 15 minutes under air ventilation and subsequent cooling. This procedure is repeated up to reach a ruthenium amount of 0.4 mg/cm² of projected area.

The samples indicated by 2A, 2B, 2C and 2D in the following Table V, coated respectively with solutions A, B, C and D, are treated according to the process of the present invention. The samples are exposed to laser radiation (4.22 KW/cm²) for an interaction time of 0.1 sec. The temperature of the titanium substrates remain below the oxide-forming temperature during exposure to the laser radiation.

Then the samples are tested in a cell for the electrolysis of diluted chlorinated brined (30 g/l of NaCl at a current density of 5 KA/m² and at a temperature of 15° C.).

The following Table V compares the electrochemical performance and stability of the eight different electrocatalytic coatings based on mixed oxides of Ti, Zr and Ru.

Conversely, the corresponding coatings 2C and 2D, prepared according to the method of the present invention, do not present any chemical or morphological modification.

Figure 7:
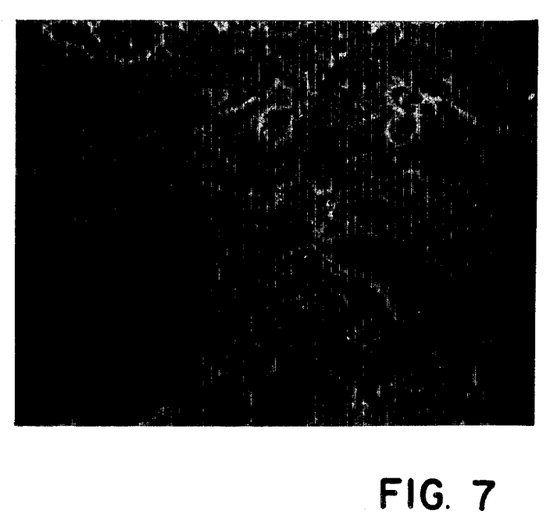
FIG. 7 is a microphotograph of the surface of another mixed oxide coating obtained according to the conventional method, as described in Example 4.
Figure 8:
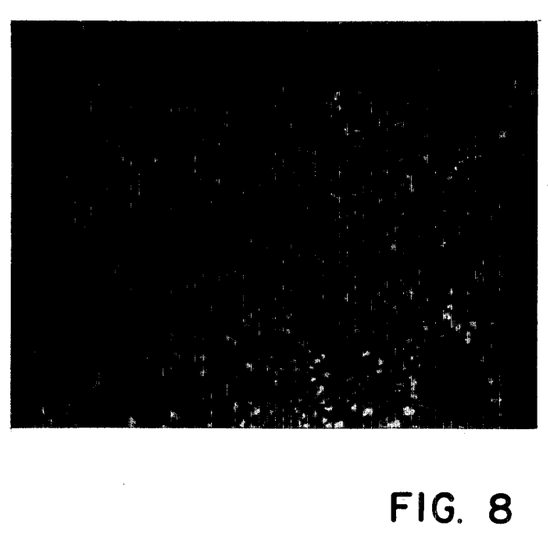
FIG. 8 is a microphotograph of the surface of a mixed oxide coating obtained according to the method of the present invention, as described in Example 4.

Microphotographs at 1000 magnification of samples 1C, and 2C reported in FIGS. 7 and 8 respectively, clearly show that in the case of oven treatment the surface presents a well defined segregated phase of zirconia (white grains in FIG. 7).

The sample 2C which has been prepared according to the method of the invention, does not show this segregated phase (FIG. 8).

EXAMPLE 5

Four titanium sheets of the dimensions $20 \times 20 \times 1.5$ mm, after etching in 20% HCl for 40 minutes at 109° C., are coated with a layer of a solution having the following composition:

| | |
|---|---|
| $RuCl_3.3H_2O$ | 100 mg/cm³ as Ru |
| $TiCl_3.3H_2O$ | 100 mg/cm³ as Ti |
| $H_2O$ | 0.9 cm³ |
| $CH_3CHOHCH_3$ | 0.1 cm³ |

The solution is applied by brush in subsequent layers up to obtain a final load of 0.4 mg of Ru per cm² of projected area.

After each application, the samples are dried under air ventilation at 50°-60° C.

Three of the four samples are subjected to laser radiation at the following conditions:

TABLE VI

| Sample | Power of the Laser Beam (kW/cm²) | Time of Interaction |
|---|---|---|
| A | 2.86 | 0.1 sec. |
| B | 3.64 | 0.1 sec. |
| C | 4.22 | (x)2 × 0.05 sec. |

(x)Two subsequent impulses

The fourth sample D is treated in oven at 450° C. for 30 minutes.

FIGS. 1, 2, 3 and 4 show the morphology of the surface of the respective samples A, B, C and D at 1000 magnification.

TABLE V

| | | Electrochemical Performance | | Coating Morphology | |
|---|---|---|---|---|---|
| | | Anodic Potential | Coating Wear Rate | | |
| Sample Description | | | After | After 100 h | | After |
| N. | Coating Activation | Initial | 100 h | mg/cm² | Initial | 100 hours |
| 1A | Conventional Method | 1.46 | 1.48 | nil | compact | compact |
| 1B | Conventional Method | 1.45 | 1.48 | nil | compact | compact |
| 1C | Conventional Method | 1.46 | 1.56 | 0.1 | cracked | very cracked and porous |
| 1D | Conventional Method | 1.46 | 1.62 | 0.3 | cracked | very cracked and porous |
| 2A | Laser irradiation | 1.45 | 1.47 | nil | compact | compact |
| 2B | Laser irradiation | 1.46 | 1.47 | nil | compact | compact |
| 2C | Laser irradiation | 1.46 | 1.47 | nil | compact | compact |
| 2D | Laser irradiation | 1.48 | 1.49 | nil | compact | compact |

From an evaluation of the data reported in Table V, it is apparent that a mixed oxide phase showing an acceptable chemical stability is obtained by the conventional method depending on very well defined limits of the ratio $ZrO_2/TiO_2$. In fact, the coating active life of sample 1C and 1D can be evaluated in the order of only a few hours.

Figure 1:
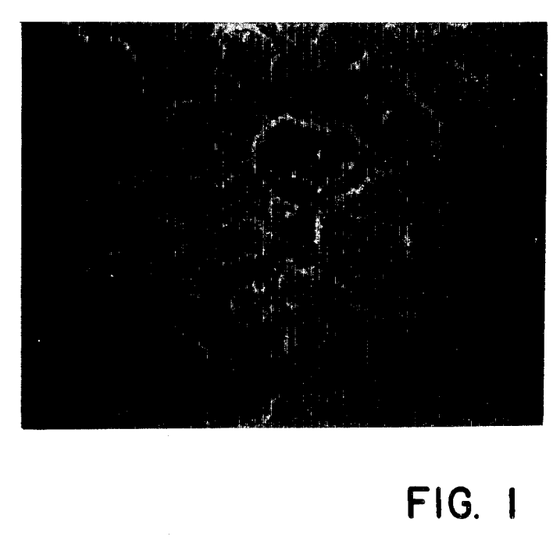
FIGS. 1, 2 and 3 are microphotographs of the surface of a mixed oxide coating of $RuO_xTiO_{2-x}$ obtained according to the method of the present invention, as described in Example 5.
Figure 2:
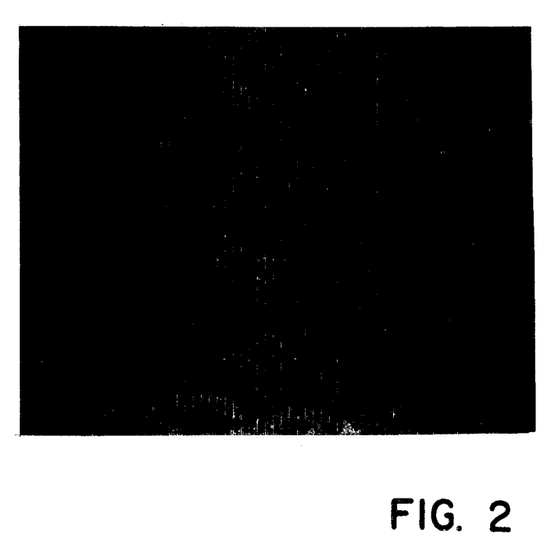
Figure 3:
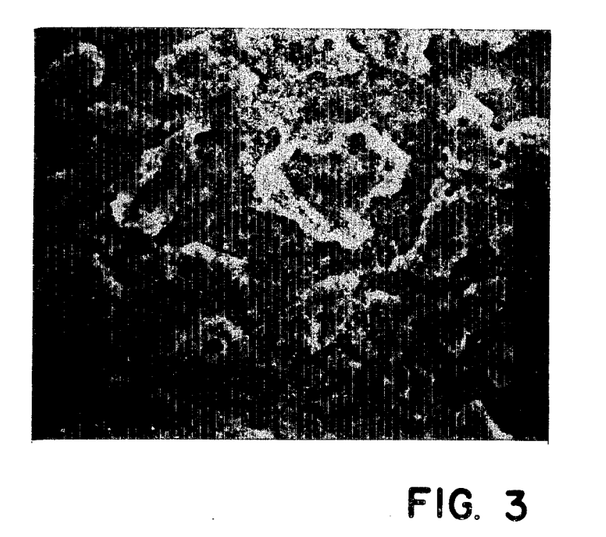
Figure 4:
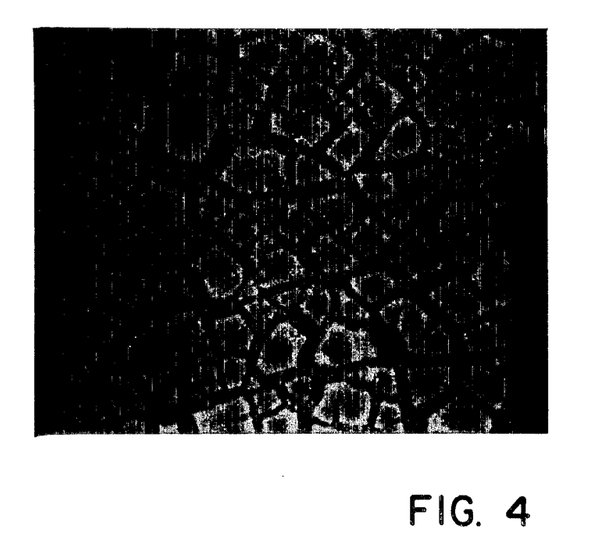
FIG. 4 is a microphotograph of the surface of a mixed oxide coating of $RuO_xTiO_{2-x}$ obtained according to the conventional method, as described in Example 5.

Comparison between the morphologies of the laser treated samples and the sample treated according to the conventional method shows that the laser treated samples have a more compact structure, substantially different from the "cracked mud" structure of the sample D (FIG. 4).

Figure 5:
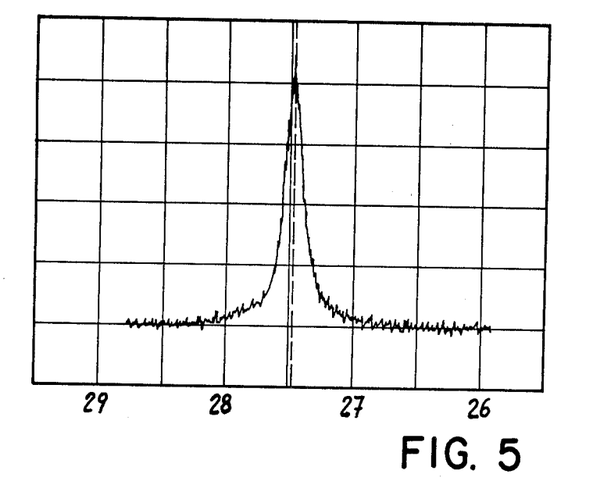
FIG. 5 shows an X-ray diffraction pattern of the coating of FIGS. 1, 2 and 3, as described in Example 5.
Figure 6:
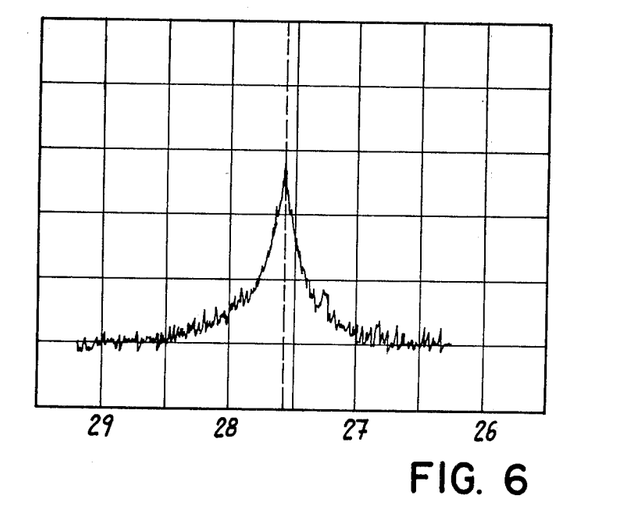
FIG. 6 shows an X-ray diffraction pattern of the coating of FIG. 4, as described in Example 5.

The samples have been analyzed by X-ray diffraction and the diffraction pattern for the laser treated samples A, B and C is shown in FIG. 5, while the diffraction pattern for the oven treated sample D is shown in FIG. 6.

The comparison of the two patterns indicates that:

(a) the rutile solid solution of $TiO_2$ and $RuO_2$ obtained with the laser treatment shows crystallographic parameter different from those relative to the rutile solid solution obtained by the oven treatment. The theoretical rutile peak is shifted toward greater angles $2\theta$ (with the $K\alpha$ radiation of Cu) in the case of the oven treated sample, while the contrary is observed in the laser treated samples. This fact finds its explanation by considering that while in the oven treated samples, wherein the decomposition takes place at low temperature and in presence of excess oxygen, the substitution of Ti atoms by Ru atoms tends to shift the pure Ti rutile peak (27.490°+ toward the pure $RuO_2$ peak (28.150°), in the laser treated samples, wherein the decomposition takes place under very short reaction times and where the oxygen availability may be reduced, the highly oxygen deficient structure give rise to an extremely defective lattice and the presence of anion vacancies tends to shift the peak toward smaller angles;

(b) the pattern for the oven treated sample D shows a definite shoulder of the rutile peak in correspondence of the pure $RuO_2$ peak 28.150°, which indicates the presence of a $RuO_2$ rich or pure $RuO_2$ phase. This feature is significantly absent in the pattern obtained with the samples prepared according to the invention.

It is clear that the process of the present invention allows to provide mixed oxides characterized, with respect to the oxides prepared according to the conventional technique, by a similar electrocatalytic activity but a higher chemical stability due to the absence of chemically labile segregated phases, which conversely characterize the mixed oxides prepared according to the conventional technique.

The passage of the radiation beam at a scanning rate of about 0.5 to 15 cm/sec. causes the almost instantaneous localized heating of the material to temperatures of about 500° to about 1500° C., obviously depending on the power of the radiation source used. In addition, the formed oxides cool very sharply, also due to the thermal dispersion capacity of the substrate and the surrounding atmosphere, which remain substantially cold, usually the oxide layer cools down to below 350° C. within 100 seconds from the beginning of the heating.

It has been found that the residence time of the salts to a temperature higher than the threshold decomposition temperature of about 300°–350° C. should preferably be lower than 100 seconds and more preferably lower than 30 seconds.

Therefore, depending on the power of the radiation source, the scanning rate should be adjusted considering the heat dispersion capacity of the substrate, in order to operate within the above defined limits.

A useful parameter is the definition of energy per unit area obtained by multiplying the specific power in the beam ($kW/cm^2$) by the interaction time and, if necessary, by the number of times the beam is shown over the same area. The energy per unit area may be comprised between 50 Joule/$cm^2$ and 1000 Joule/$cm^2$ and more preferably is comprised between 200 and 500 Joule/$cm^2$.

Another valuable advantage of the method of the invention with respect to the conventional method of treatment in ovens is the exceptional reduction of the time of treatment to prepare a coated article of a certain surface. In fact, the scanning speed of the beam can be extremely high, especially with beams of large specific power, therefore the time necessary to treat an article is only a fraction of the time the same article would need to stay in the oven according to the conventional process.

Although the present invention has been described with special reference to forming the oxide coatings herein contemplated by laser beam scanning, it is also to be understood that other electromagnetic radiation capable of generating heat in situ in the coating of substrate may be resorted to. For example, the valve metal substrate during or after coating with the oxide forming material may be subjected to other electromagnetic radiation, such as electron beam radiation, induction heating, for example by microwave energy or other such energy source, which itself usually is at a low temperature but is capable of generating decomposing or oxide forming temperature internally in either the substrate or the coating. Since this process is conducted in a surrounding atmosphere whether oxidizing or vacuum which, except in immediate proximity to the coating, is lower in temperature than the forming coating oxide formation is confined to the coating and/or substrate and the coated substrate rapidly falls, i.e. within 100–200 seconds, to a temperature below decomposition temperature, thus inhibiting any tendency to form other metal phases in the substrate or coating or interface between coating and valve metal substrate.

Advantageously the radiation is in the visible range of frequency.

What is claimed is:

1. In a process of preparing an electrode comprising a valve metal substrate and an electroconductive metal coating by applying a compound of said metal capable of decomposing to said substrate and decomposing said coating by heating to form said electroconductive coating, the improvement which comprises subjecting said coating to localized high intensive heat sufficient to decompose said compound while maintaining at least a portion of the substrate at a lower temperature than that of said coating to quench cool the coating and wherein the bulk of the substrate and the atmosphere surrounding the coating are maintained at a lower temperature than that of said coating during the localized high intensive heat.

2. The process of claim 1, wherein said coating is subjected to localized high intensive heat in an oxidizing atmosphere.

3. The process of claim 1 wherein said oxidizing atmosphere is air.

4. The process of claim 1 or 2 wherein said decomposition temperature is about 450° to 1500° C.

5. The process of claim 1 or 2 wherein said coating is heated to a temperature of about 600°–1000° C.

6. In a process of preparing an electrode comprising a valve metal substrate and an electroconductive metal coating by applying a compound of said metal capable of decomposing to said substrate and decomposing said coating by heating to form said electroconductive coating, the improvement which comprises subjecting said coating to localized high intensive heat by means of scanning laser beam radiation sufficient to decompose said compound while maintaining at least a portion of the substrate at a lower temperature than that of said coating to quench cool said coating.

7. The process of claim 6, wherein said coating is subjected to localized high intensive heat in an oxidizing atmosphere.

8. In a process of preparing an electrode comprising a valve metal substrate and an electroconductive metal coating by applying a compound of said metal capable of decomposing to said substrate and decomposing said coating by heating to form said electroconductive coating, the improvement which comprises subjecting said coating to localized high intensive heat for a time of 100 seconds or less, sufficient to decompose said compound while maintaining at least a portion of the substrate at a lower temperature than that of said coating to quench cool said coating.

9. The process of claim 8 wherein said coating is subjected to localized high intensive heat in an oxidizing atmosphere.

10. The process of claim 6 wherein the scanning rate of said laser beam radiation is about 0.5-15 cm/sec.

11. The process of claim 6 wherein the radiation energy per unit area is between 50 and 1000 Joule per cm$^2$.

12. The process of claim 6 or 7 wherein said compound is subjected to localized heating by laser radiation to a temperature above about 500° C. and remains at a temperature above about 350° C. for a time of 100 seconds or less but sufficient to form said electroconductive metal coating.

13. The process of claim 8 or 9 wherein said compound is subjected to said heat for less than about 30 seconds.

14. The process of claim 8 wherein said substrate is titanium.

15. The process of claim 8 wherein said compound is a thermally reducible metal salt.

16. The process of claim 8 wherein said coating includes mixed oxides of at least one metal belonging to the platinum group and at least one valve metal.

17. The process of claim 16 wherein the platinum group metal is ruthenium.

18. The process of claim 16 wherein said valve metal is titanium.

19. The process of claim 16 wherein said coating is a mixed oxide of titanium and ruthenium.

20. A process for preparing homogeneous phases of oxides of at least two different metals wherein a mixture of thermally reducible salts of said metals is subjected to localized heating in an oxidizing atmosphere to a temperature above the decomposition temperature of the reducible salts by means of a scanning laser beam and the oxides are cooled to below 350° C. within 100 seconds or less from the instant of the application of the heat.

21. The process of claim 20 wherein the thermally reducible salts are subjected to localized heating in an oxidizing atmosphere by means of a scanning laser beam to a temperature in excess of 500° C. and remain at a temperature above 350° C. for a time of 100 seconds or less.

22. The process of claim 21 wherein the homogeneous phase of mixed oxides is prepared on a valve metal substrate.

23. The process of claim 20 or 21 wherein the homogeneous phase of mixed oxides is prepared on a substrate selected from the group of valve metals, ceramics, glass or polymeric organic supports.

24. The process of claim 21 wherein said mixture is heated to a temperature of about 600°-1500° C.

25. The process of claim 21 wherein the scanning rate of said laser beam radiation is about 0.5-15 cm/sec.

26. The process of claim 1 wherein the radiation energy per unit area is between 50 and 1000 Joule per cm$^2$.

27. The process of claim 22 wherein said substrate is titanium.

28. The process of claim 21 wherein said mixed oxides include oxides of at least one metal belonging to the platinum group and at least one valve metal.

29. The process of claim 28 wherein the platinum group metal is ruthenium.

30. The process of claim 28 wherein said valve metal is titanium.

31. The process of claim 21 wherein said oxides are mixed oxides of titanium and ruthenium.

32. The process of claim 22 which further comprises removing said homogeneous phases of mixed oxides after formation from said substrates.

33. The process of claim 20 wherein the scanning rate of said laser beam radiation is about 0.5-15 cm/sec.

34. The process of claim 20 wherein the radiation energy per unit area is between 50 and 1000 Joule per cm$^2$.

35. The process of claim 20 wherein said oxidizing atmosphere is air.

36. The process of claim 20 wherein said decomposition temperature is about 350°-1500° C.

37. The process of claim 20 wherein said salts are heated to a temperature of about 600°-1000° C.

38. The process of claim 20 wherein said salts are subjected to localized heating to a temperature above about 500° C.

39. The process of claim 20 wherein said salts are subjected to said heating for less than about 30 seconds.

40. The process of claim 20 wherein the homogeneous phase of mixed oxides is prepared on a valve metal substrate.

41. The method of claim 39 wherein said substrate is titanium.

42. The process of claim 20 wherein said mixed oxide comprises oxides of at least one metal belonging to the platinum group and at least one valve metal.

43. The process of claim 12 wherein the platinum group metal is ruthenium.

44. The process of claim 42 or 43 wherein said valve metal is titanium.

45. A method of coating a valve metal substrate with an oxide which comprises coating the substrate with a decomposable metal compound capable of forming a metal oxide by thermal decomposition and subjecting the coated substrate to electromagnetic radiation which generates heat internally in the compound or substrate while exposing the coated substrate to an atmosphere which is below said decomposition temperature to quench cool the coating.

46. The method of claim 45 wherein the radiation is in the visible range.

47. The method of claim 45 wherein the atmosphere is oxidizing.

48. The method of claim 45 wherein the substrate is coated with a mixed oxide coating comprising at least two different metals.

49. The process of claim 1 or 2 wherein said coating is subjected to electromagnetic radiation.

50. The process of claim 6 wherein the radiation energy per unit area is between 200 and 500 joule/cm$^2$.

51. The process of claim 26 or 34 wherein the radiation energy per unit area is between 200 and 500 joule/cm$^2$.

* * * * *